(12) United States Patent
Rotgaizer

(10) Patent No.: US 8,155,527 B2
(45) Date of Patent: Apr. 10, 2012

(54) APPARATUS AND METHOD FOR SENDING AND RECEIVING FREE SPACE OPTICAL SIGNALS

(75) Inventor: Naftali Rotgaizer, Ness Ziona (IL)

(73) Assignee: Igor Melamed, Ontario (CA)

( * ) Notice: Subject to any disclaimer, the term of this patent is extended or adjusted under 35 U.S.C. 154(b) by 929 days.

(21) Appl. No.: 12/099,711

(22) Filed: Apr. 8, 2008

(65) Prior Publication Data

US 2009/0252499 A1    Oct. 8, 2009

(51) Int. Cl.
*H04B 10/00* (2006.01)
(52) U.S. Cl. .................. 398/122; 398/129; 398/131
(58) Field of Classification Search .......... 398/122–123, 398/129, 131
See application file for complete search history.

(56) References Cited

U.S. PATENT DOCUMENTS

| | | | |
|---|---|---|---|
| 3,989,942 A | 11/1976 | Waddoups | |
| 4,995,101 A * | 2/1991 | Titterton et al. | 398/125 |
| 5,790,291 A | 8/1998 | Britz | |
| 6,181,450 B1 | 1/2001 | Dishman et al. | |
| 6,271,953 B1 | 8/2001 | Dishman et al. | |
| 6,347,001 B1 * | 2/2002 | Arnold et al. | 398/122 |
| 6,570,692 B2 | 5/2003 | Doucet et al. | |
| 6,792,185 B1 | 9/2004 | Ahrens et al. | |
| 6,915,080 B2 * | 7/2005 | Heminger et al. | 398/129 |
| 6,967,754 B2 | 11/2005 | Bratt et al. | |
| 6,970,651 B1 | 11/2005 | Schuster et al. | |
| 7,212,706 B2 | 5/2007 | White et al. | |
| 7,343,099 B2 | 3/2008 | Wirth et al. | |
| 7,424,225 B1 * | 9/2008 | Elliott | 398/115 |
| 7,991,294 B2 * | 8/2011 | Dreischer et al. | 398/137 |
| 2003/0035178 A1 | 2/2003 | Seaver | |
| 2004/0151504 A1 * | 8/2004 | Triebes et al. | 398/131 |

FOREIGN PATENT DOCUMENTS

WO    WO 03016959 A2    2/2003

OTHER PUBLICATIONS

Kahn, Secure Free-Space Optical Communication Between Moving Platforms, Lasers and Electro-Optics Society, 2002, LEOS 2002, The 15th Annual Meeting of the IEEE, Publication Date: Nov. 10-14, 2002, vol. 2, on pp. 455-456 vol. 2.

* cited by examiner

*Primary Examiner* — Danny Leung
(74) *Attorney, Agent, or Firm* — Morris & Kamlay LLP

(57) ABSTRACT

A free space optical communication system incorporates a kinematic sensor, such as an accelerometer, proximate an optical signal generator or emitter, such as a laser. Kinematic information generated using an output signal from the kinematic sensor is encoded along with a time signal and transmitted from the sending node to a receiving node. The receiving node receives the kinematic information and determines a future position and orientation of the sending node. The receiving node makes adjustments to receiving optical component hardware in order to better receive the signal based upon the acceleration data and the time signal.

19 Claims, 11 Drawing Sheets

APPARATUS AND METHOD FOR SENDING AND RECEIVING FREE SPACE OPTICAL SIGNALS

FIELD OF THE INVENTION

The instant invention relates generally to free space optical communication systems, and more particularly to laser beam tracking and pointing for free space optical communication systems.

BACKGROUND

A variety of technologies are available for supporting high data rate communication. In applications where it is desired to support very high bandwidth it is common to provide an optical waveguide, also referred to as a fiber optic cable or optical fiber, between a light source and a receiver. Thus, a light source provides a light signal to an optical waveguide and the optical waveguide guides the light signal to the receiver. Unfortunately, in many cases it is not convenient or even feasible to string an optical fiber from one location to another location. In addition, optical waveguides are subject to physical damage.

An alternative communication system uses radio signals to transfer data. A radio communications system is much easier to install than a system that relies upon optical waveguides because typically there is no need for any physical infrastructure between the transmitter and the receiver. Unfortunately, radio communication systems offer lower bandwidth than optical communication systems. In addition, since radio signals typically are not well confined, the transmitted signal is fairly easy to monitor.

In order to provide high bandwidth communication between two locations that are fairly close together it is also known to use free space optics. A free space optical communication system uses typically a laser to emit an optical signal toward a receiver. The optical signal is not confined by an optical waveguide and so it is a requirement that the emitter and the receiver have an unobstructed line of sight therebetween. Free space optical (FSO) systems also have a few inherent drawbacks. For example, any object that is disposed between the signal emitter and the signal receiver will affect the propagation of the optical signals. In addition, the distance between the signal emitter and the receiver is limited to about 2 kilometers using conventional laser-based FSO equipment. Another challenge to using free space optical systems is that it is often difficult to ensure that the separate components are aligned correctly. More specifically, while the components may be properly aligned at one point in time, that alignment is subject to change under normal operating conditions. For example, if a laser-based emitter is disposed on the top of a very high tower then the laser may move slightly in very windy conditions. Alternatively, a train passing nearby may shake the earth beneath the tower enough that the laser is pointing momentarily in a direction that prevents good communications. Similarly, the receiver is also subject to small movements that may reduce signal quality.

The prior art teaches a variety of techniques for minimizing the effects of these types of alignment problems in FSO systems. For example, CANON™ supports a product called "CANOBEAM™" which is a laser signal emitter featuring a system to compensate for small, angular misalignments.

In U.S. Pat. No. 6,347,001 issued to Arnold et al., the entire contents of which is incorporated herein by reference, an error signal indicative of angular misalignment is generated. This signal is provided to an actuator that serves to compensate for the misalignment. The tracking system of Arnold et al. uses an actuated mirror to support both a communications laser and a fine tracking centroider. The actuator for controlling the orientation of the mirror relies upon an error signal that is proportional to an angular difference between the bore sight of the receiving terminal and the line of sight to the opposite transceiver.

The above-mentioned systems and techniques are suitable for their intended purpose of compensating for small, angular misalignments between emitters and sensors that are mounted to stationary structures. Unfortunately, this type of compensation does not allow for the use of FSO communication between mobile platforms, such as for instance moving vehicles, etc.

It would be beneficial to provide a system that supports robust free space optical communication by ensuring that the laser and receiver are properly aligned.

SUMMARY OF EMBODIMENTS OF THE INVENTION

According to at least one embodiment of the instant invention, sensor data relating to current kinematic information is provided along with a conventional data transmission between communicating FSO devices. According to at least one embodiment of the instant invention, an accelerometer is integrated into each FSO communication device for measuring the said current kinematic information.

According to an aspect of the instant invention there is provided an apparatus for sending and receiving free space optical signals, comprising: a kinematic information sensor for providing first kinematic data relating to the apparatus at a first known time; a transmitter for launching a first optical signal along a free space optical communications pathway, the first optical signal comprising the first kinematic data; a receiver for sensing a second optical signal, the second optical signal comprising second kinematic data relating to a second apparatus at a second known time; a processor for determining alignment data for aligning the transmitter and the receiver of the first apparatus with a receiver and a transmitter of the second apparatus, respectively, the alignment data being determined based on the first kinematic data and the second kinematic data; and, an actuator in communication with the transmitter and with the receiver, for aligning the transmitter and the receiver in dependence upon the determined alignment data.

According to an aspect of the instant invention there is provided an apparatus for sending and receiving free space optical signals, comprising: an accelerometer for measuring first acceleration data relating to the apparatus; a timer for providing first time data that is indicative of a time of measurement of the first acceleration data; an encoder for providing an encoded signal comprising the first acceleration data and the first time data; an emitter for launching a first optical signal along a free space optical communications pathway, the first optical signal comprising the encoded signal; an optical sensor for sensing a second optical signal that is emitted from a second apparatus, the second apparatus also being an apparatus for sending and receiving free space optical signals; a decoder for extracting from the second optical signal second acceleration data relating to the second apparatus and second time data indicative of a time of measurement of the second acceleration data; a processor for determining alignment data for supporting free space optical communication between the apparatus and the second apparatus at a future time; and, an actuator for adjusting an alignment status of the emitter and of the optical sensor based on the alignment data, wherein the alignment data is determined based on the first acceleration data, the first time data, the second acceleration data and the second time data.

According to an aspect of the instant invention there is provided a method for aligning optical components of a free space optical (FSO) communications system, comprising: determining first kinematic data relating to a first FSO communications device of the FSO communications system at a first known time, using a kinematic sensor that is local to the first FSO communications device; receiving at the first FSO communications device a FSO communications signal transmitted from a second FSO communications device of the FSO communications system, the FSO communications signal comprising second kinematic data relating to the second FSO communications device at a second known time; processing the first kinematic data and the second kinematic data locally with respect to the first FSO communications device, for determining alignment data for supporting communication between the first FSO communications device and the second FSO communications device at a future time; and, aligning the optical components of the first FSO communications device based on the determined alignment data.

According to an aspect of the instant invention there is provided a method for aligning optical components of a free space optical (FSO) communications system, comprising: measuring first kinematic data using a sensor mounted within a first FSO communications device of the FSO communications system; measuring second kinematic data using a sensor mounted within a second FSO communications device of the FSO communications system; providing the first kinematic data to the second FSO communications device; providing the second kinematic data to the first FSO communications device; processing the first kinematic data and the second kinematic data locally with respect to the first FSO communications device for determining first alignment data for supporting communication with the second FSO communications device at a future time; and, processing the first kinematic data and the second kinematic data locally with respect to the second FSO communications device for determining second alignment data for supporting communication with the first FSO communications device at the same future time.

According to an aspect of the instant invention there is provided an apparatus for sending and receiving free space optical signals, comprising: a kinematic sensor for providing first kinematic data relating to the apparatus; a timer for providing first time data that is indicative of a time of measurement of the first kinematic data; a plurality of free space optical communication ports, each one of the plurality of free space optical communication ports comprising: an emitter for launching a first optical signal along a free space optical communications pathway, the first optical signal comprising the first kinematic data and the first time data; an optical sensor for sensing a second optical signal, the second optical signal comprising second kinematic data relating to a second apparatus and comprising second time data that is indicative of the time of measurement of the second kinematic data; a processor in communication with the kinematic sensor for receiving the first kinematic data therefrom and in communication with the timer for receiving the first time data therefrom, the processor for determining alignment data for aligning the emitter and the optical sensor with an optical sensor and an emitter of the second apparatus, respectively, the alignment data being determined based on the first kinematic data and the second kinematic data; and, an actuator in communication with the emitter and with the optical sensor, for aligning the emitter and the optical sensor in dependence upon the determined alignment data; and, a switch for supporting exchange of payload data between different free space optical communication ports of the plurality of free space optical communication ports.

BRIEF DESCRIPTION OF THE DRAWINGS

Exemplary embodiments of the invention will now be described in conjunction with the following drawings, in which similar reference numerals designate similar items.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Throughout the detailed description and in the appended claims, the following terms are to be defined as follows. The term "alignment" refers to a relative spatial orientation between the optical components of two FSO devices, which supports communication therebetween via a free space optical communications pathway. The term "aligning" refers to changing the relative spatial orientation between the optical components of two FSO devices in a way that improves or enhances alignment therebetween. It is to be understood that the term "aligning," when used with reference to only one FSO device or system, means changing the spatial orientation of the one FSO device or system relative to a second other FSO device or system. The term "adjusting an alignment status" means changing the relative spatial orientation between the optical components of two FSO devices from a first relative spatial orientation to a second relative spatial orientation so as to improve or enhance alignment therebetween.

Figure 1:
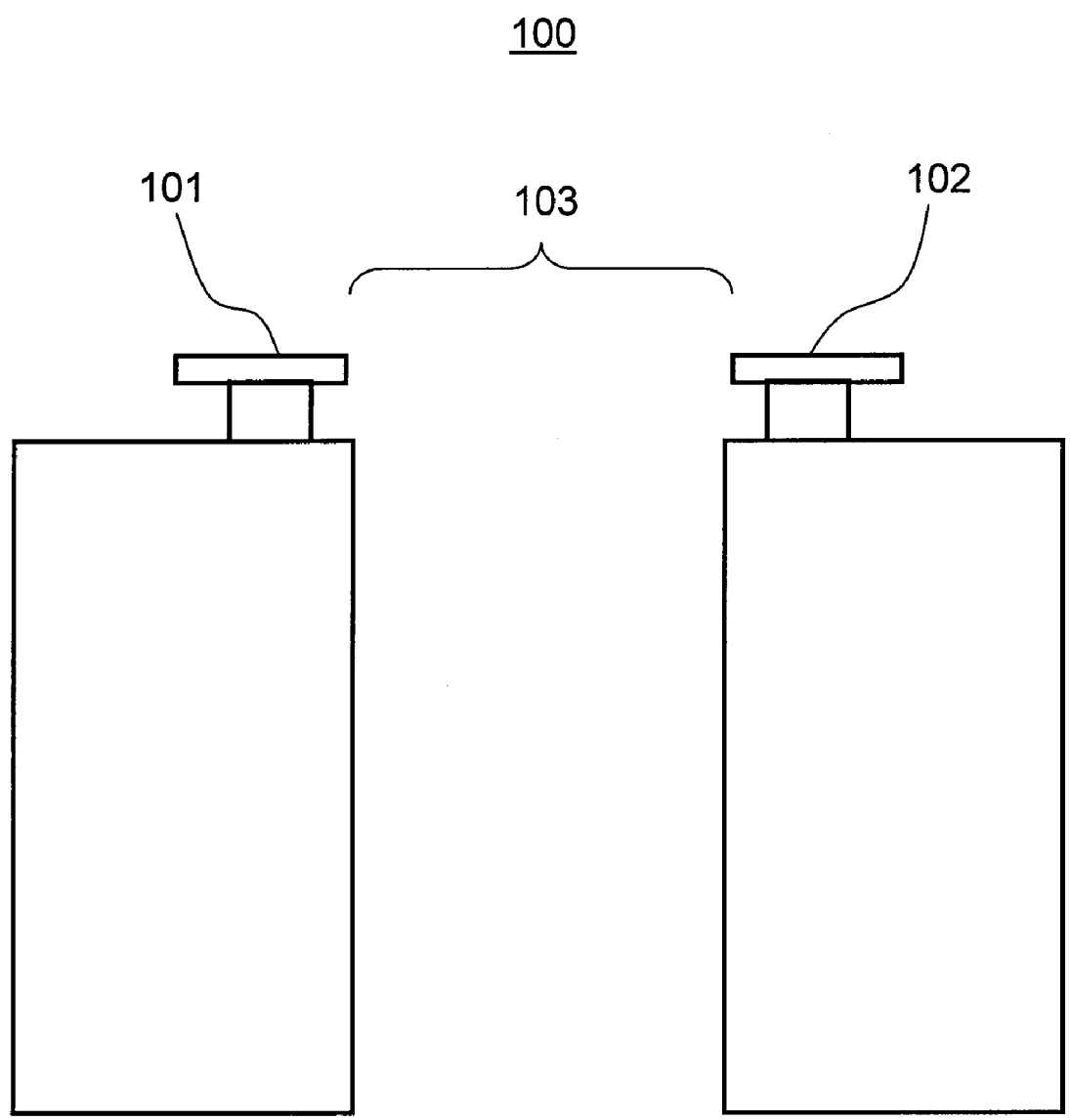
FIG. 1 is a simplified schematic diagram of a prior art FSO system.

Referring to FIG. 1, shown is a conventional FSO system 100 including a laser 101 and an optical sensor 102 for receiving signals from the laser 101. A free space optical communications path 103 supports communication from the laser 101 to the optical sensor 102. When the optical sensor 102 is unable to track the laser 101, the optical signal that is generated by the laser 101 may not be received at the optical sensor 102. Accordingly, a variety of prior art systems incorporate actuators that are intended to compensate for misalignment between the laser 101 and the optical sensor 102. Many of the prior art techniques, such as the one that is described in U.S. Pat. No. 6,347,001, rely upon generating an error signal based upon a determined misalignment of the optical sensor 102 and the laser 101.

A person of skill in the art will appreciate that a variety of optical components are optionally disposed between the laser 101 and the optical sensor 102. These optical components typically are included in order to increase the intensity of the optical signal that is incident upon the optical sensor 102, thereby supporting good communication over longer distances. The disadvantage of providing such components is that the resulting FSO system is often rendered more sensitive to misalignment between the laser 101 and the optical sensor 102.

Figure 2:
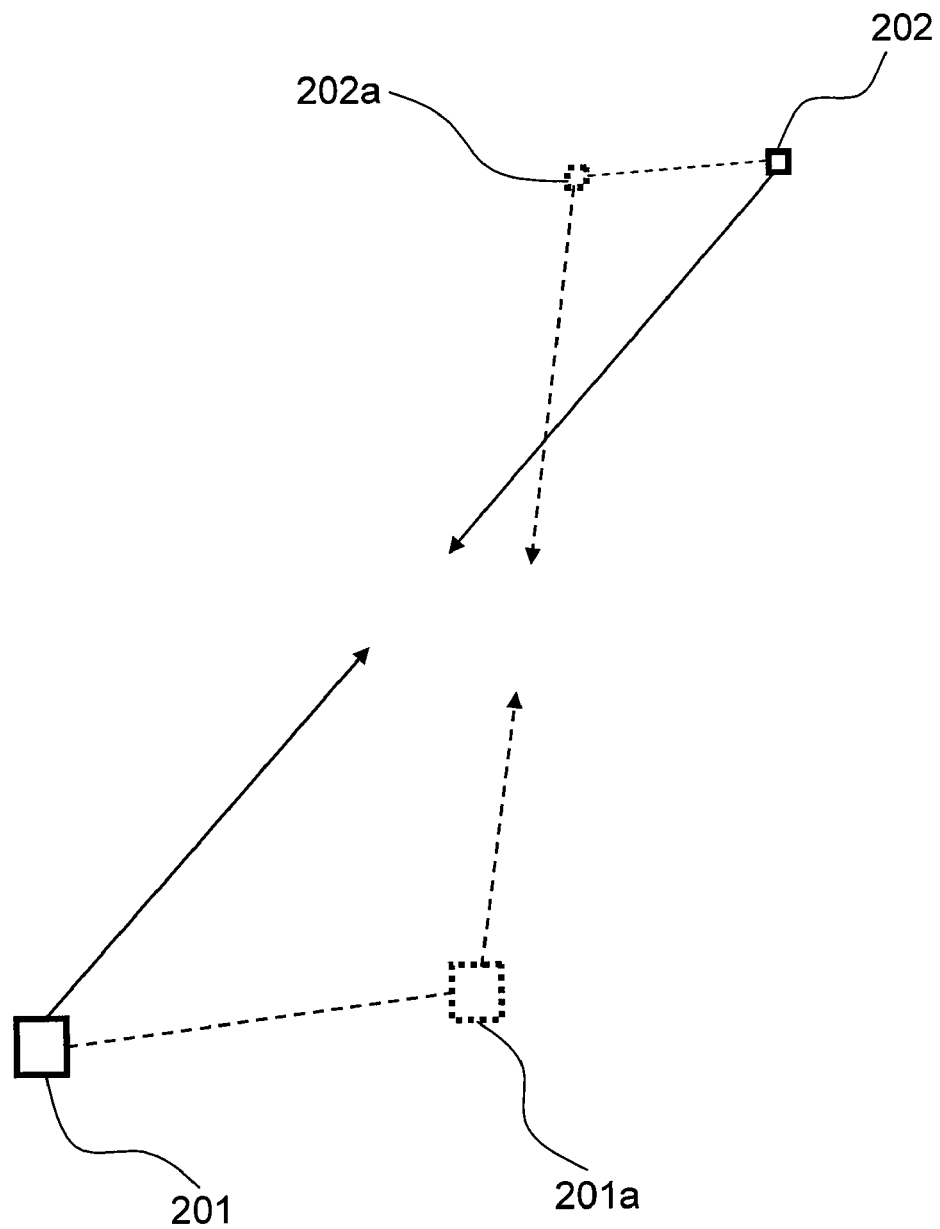
FIG. 2 is a simplified diagram showing two mobile FSO devices according to an embodiment of the instant invention.

Referring now to FIG. 2, shown is a schematic diagram of two mobile FSO devices according to an embodiment of the instant invention. Each of the FSO devices 201 and 202 includes an emitter, such as for instance a not illustrated laser, as well as a not illustrated sensor for receiving an emitter signal from the emitter of the other FSO device. In particular, each FSO device employs actuated optical elements, so as to achieve good optical coupling between the emitter of one FSO device and the sensor of the other FSO device. Such optical elements typically are very sensitive and consequently it is desirable to ensure proper alignment of the optical elements in order to support a robust FSO data connection between FSO devices 201 and 202. In order to accurately align the optical elements, it is beneficial to have an accurate estimate of the location of the target FSO device relative to the sending FSO device. Without an accurate prediction of the relative location of the target FSO device, there is a high probability that the sending FSO device will "miss" the target FSO device, resulting in "loss" of the FSO signal.

In order to minimize errors in alignment between the FSO devices, each FSO device 201 and 202 is provided with a kinematic sensor that is suitable for measuring local kinematic information associated with the emitter and optical sensor of the FSO device. There are a variety of sensors that are suitable for measuring kinematic information, such as for instance speed sensors, accelerometers and global positioning system (GPS) receivers, to name but a few non-limiting examples. When both of the FSO devices 201 and 202 share kinematic information therebetween, it becomes possible to generate a prediction of the locations and orientations (i.e. 201a and 202a in FIG. 2) of the FSO devices one relative to the other at a near future time. In this way the FSO devices align their optical elements relative to each other, and accordingly maintain good optical coupling therebetween, over time.

A person of skill in the art of kinematics will appreciate that there are a variety of different kinematic data that are useable for estimating the future location of the FSO devices. For example, in a first case a FSO device includes a six-axis accelerometer and the kinematic information is current acceleration information. In this case it is also necessary to provide an initial condition of displacement and velocity. Alternatively an accelerometer on a first FSO device provides six-axis acceleration information that is processed along with sensed current velocity and sensed position data by the first FSO device to generate a specific future estimated position and orientation thereof. In this case, the kinematic information comprises estimated future position and orientation information relating to the first FSO device. Thus, the receiving FSO device simply decodes the position and orientation information. In yet another case, a first FSO device determines a current position and orientation using an external telemetry signal. The first FSO device includes a six-axis velocity sensor. The current position and orientation information, along with the six-axis velocity information, is then provided to a second FSO device, which estimates a future position and orientation of the first FSO device. A variety of other methods of estimating future position and orientation information may also be envisaged by one of skill in the art.

It is convenient to describe the FSO devices as using a same optical element for emitted and sensed optical signals, even though this may introduce certain complexities into the optical design. That being said, such designs do exist, for example Arnold et al. in U.S. Pat. No. 6,347,001 makes use of a single mirror supporting both an emitter and a sensor. However, for a given FSO device the sensor and the emitter need not be disposed at the same location. Thus, some FSO devices have a sensor that is provided at a different location than the emitter. In this configuration it is expected that the sensor include a first optical element mechanically coupled to a first actuator and that the emitter include a second optical element mechanically coupled to a second actuator.

For many applications, kinematic information conveniently is shared between communicating FSO devices via the FSO communication link itself. However, for some applications this need not be the case. For instance, an airplane and a ground station may use a FSO secure communication link for exchanging secure data therebetween. The position and orientation of the aircraft is not secure information and accordingly this data may be transmitted to the ground station via radio signals. Accordingly, the future position of the aircraft-based FSO relative to the ground-station-based FSO is determined in a straightforward manner, based on the transmitted position and orientation data of the aircraft.

For completeness, it should also be noted that the distance between FSO devices represents very useful information for estimating the future positions and orientations. A person of skill in the art will appreciate that a FSO link is optionally used to send an electromagnetic signal between the FSO devices, and that an accurate measurement of the duration of the signal may then be used to compute the distance between the FSO devices.

Of course, over extended periods of time even small errors in the estimated future positions of the FSO devices may accumulate and lead to a failure to align the FSO devices. There are a variety of prior art techniques available that attempt to overcome this problem. By way of a specific and non-limiting example, the optical sensor is provided as an array of optical sensor elements. When the FSO devices are "ideally" aligned, a central sensor element of the sensor array receives the optical signal. When the FSO devices are only slightly misaligned the optical signal is incident on a sensor element other than the central sensor element. This deviation is optionally used to estimate errors in the present kinematic information, and to compensate for such errors. Clearly, providing a larger number of sensor elements on an optical sensor array supports providing more accurate feedback information and/or compensates for larger errors. This technique is described by Dishman et al. in U.S. Pat. No. 6,181,450, the entire contents of which is incorporate herein by reference, and by Kahn in "Secure Free-Space Optical Communication Between Moving Platforms," EECS Department, University of California, Berkeley, Calif. 94720 USA. However, larger arrays of sensor elements are expensive and are not robust. By way of another specific and non-limiting example, a first FSO device provides a cone shaped optical signal that is used to scan and determine the location of one or more predetermined targets on a second FSO device. When a target is found, the first FSO device is able to verify the relative position and orientation of the second FSO device.

Figure 3A:
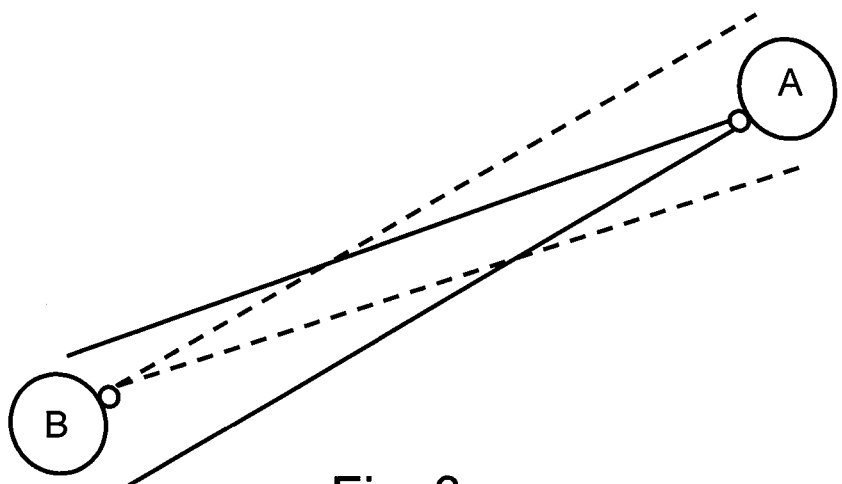
FIG. 3a is a simplified diagram illustrating two FSO devices prior to calibration.
Figure 3B:
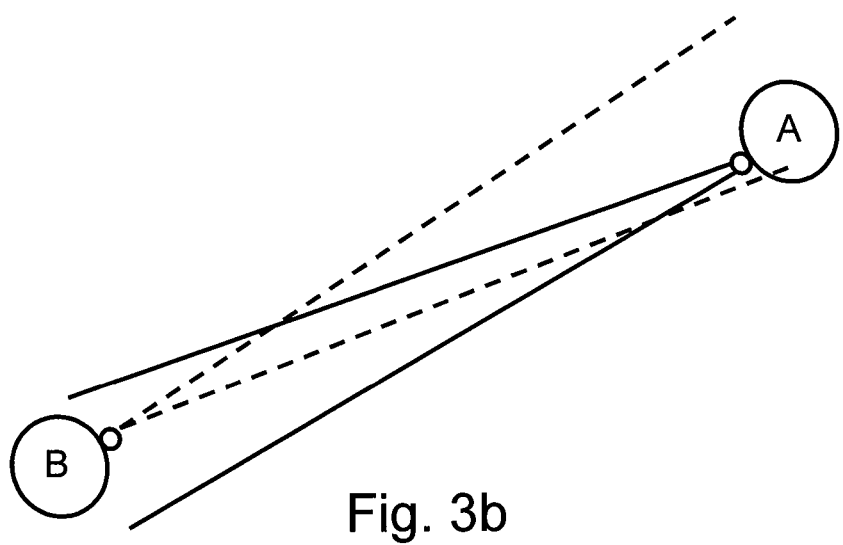
FIG. 3b shows the two FSO devices of FIG. 3a during a calibration process.
Figure 3C:
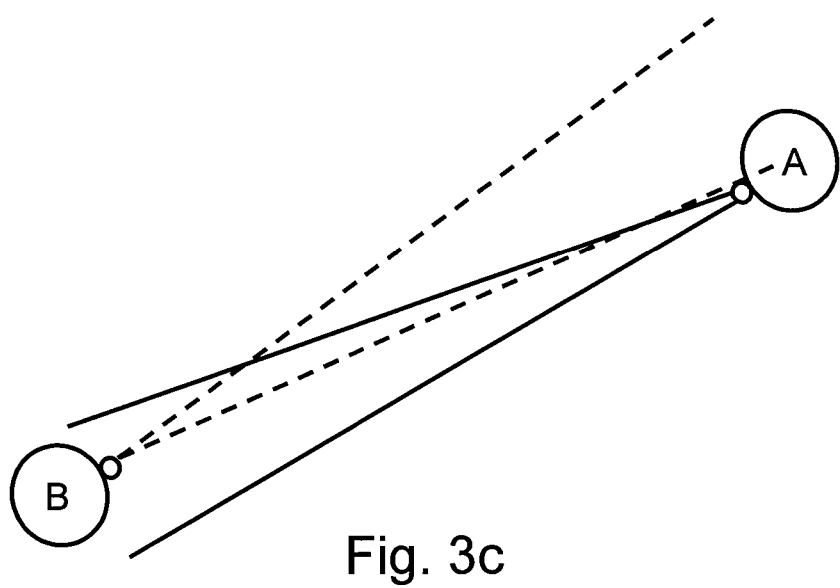
FIG. 3c shows the two FSO devices of FIG. 3a when a boundary is detected.

Referring now to FIGS. 3a-3c, shown is a series of illustrations depicting another technique for calibrating an FSO communications system. The solid and dashed lines represent divergence of optical signals that are emitted by devices A and B, respectively. In other words, each of the devices A and B emits a cone-shaped optical signal toward the other device. In FIG. 3a, both of devices A and B are "inside" the cone-shaped optical signal that is emitted by the other device, but neither device is centered within the cone-shaped optical signal. In FIG. 3b, the device B has turned an emitter thereof in a counter-clockwise direction (in the plane of the page), by an angle that is much smaller than the divergence of the optical signal. Device A is still within the cone-shaped optical signal, and sends a response to device B. As is shown in FIG. 3c, after a few iterations the optical sensor of device A is outside the cone-shaped optical signal emitted by device B, and accordingly device B does not receive a response from device A. Device B marks the current emitter orientation as a boundary, and then re-aligns the emitter with the optical sensor of device A. Device B performs similar measurements in order to determine a sufficient number of additional boundaries around the optical sensor of device A, and then calculates precisely the location of the optical sensor of device A. Calibration for accumulated errors is then performed based on the precisely calculated location of the optical sensor of device A.

Figure 4:
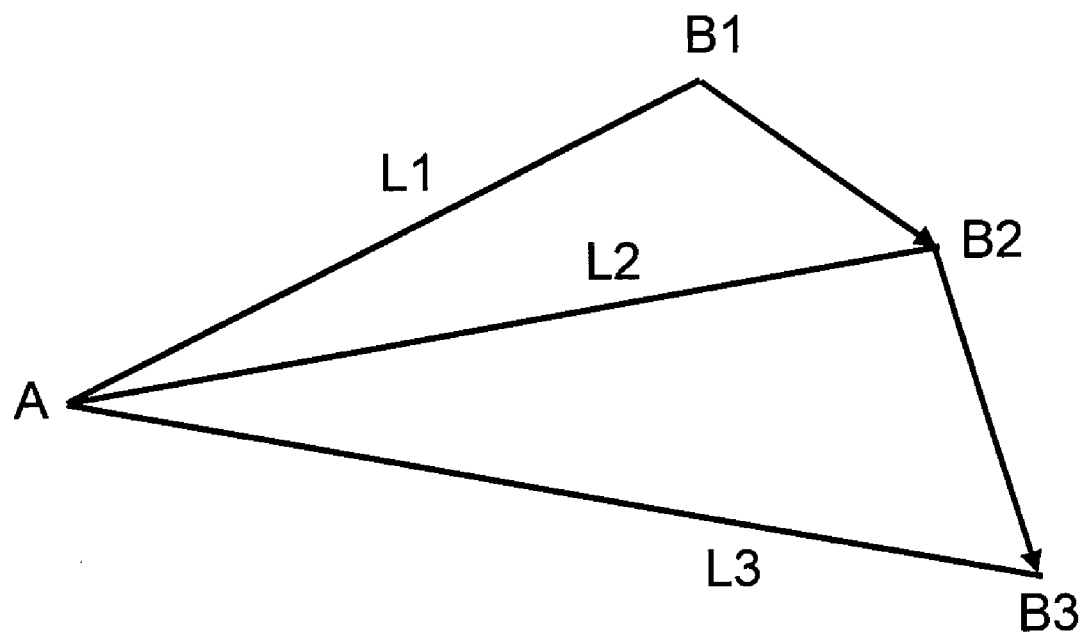
FIG. 4 is a simplified diagram illustrating the positions B1, B2 and B3 of a FSO device B relative to a FSO device A at the times $t_1$, $t_2$ and $t_3$, respectively.

Optionally, calibration of the FSO communications system is based on precise measurements of propagation delay between two communicating FSO devices, as is shown in FIG. 4. Such a calibration method assumes that the accumulated position estimation error is constant between propagation delay measurements, and that the distance between communicating FSO devices can be measured with sufficient accuracy. The coordinates of device B versus device A (x, y, z) as measured using an accelerometer may be presented as (x'+$\Delta$x, y'+$\Delta$y, z'+$\Delta$z), where (x', y', z') are the actual coordinates of B and ($\Delta$x, $\Delta$y, $\Delta$z) is a vector of accumulated error. Thus, the estimated coordinates of device B versus device A at times $t_1$, $t_2$ and $t_3$ may be summarized respectively as:

B1~(x1'+$\Delta$x, y1'+$\Delta$y, z1'+$\Delta$z)
B2~(x2'+$\Delta$x, y2'+$\Delta$y, z2'+$\Delta$z)
B3~(x3'+$\Delta$x, y3'+$\Delta$y, z3'+$\Delta$z)

where it is assumed that the accumulated error during the three consecutive measurements (at positions B1, B2 and B3) can be ignored. The distances L1, L2 and L3 between device A and device B at times $t_1$, $t_2$ and $t_3$, respectively, are measured accurately. Next, the actual coordinates of B1, B2 and B3 versus device A are determined mathematically based on the estimated coordinates of B1, B2 and B3 as measured using the accelerometer and based on the accurately measured distances L1, L2 and L3. Once the actual coordinates of B1, B2 and B3 are known, it is possible to calibrate the system to a condition in which the instantaneous vector of accumulated error is zero. Advantageously, the feedback method discussed supra is based on precise distance measurements as a reference for correction of estimated coordinates. Application of the method does not require additional components for either of the devices A or B, and does not affect communication bandwidth.

It is also worth mentioning that FSO systems require at least a partially transparent path between an emitter and a sensor thereof. Therefore, it is an expected result that a FSO system will lose the FSO communication signal when the FSO path is blocked, even though the emitter and the sensor are otherwise correctly aligned. There are a variety of techniques available for reestablishing communication between the nodes of an FSO system when the FSO path once again becomes available after being blocked for a period of time. Unfortunately, re-establishing communication between FSO nodes may take some time, thereby delaying the use of the FSO communications link. Clearly, such disruptions are to be avoided. Advantageously, a system according to at least an embodiment of the instant invention is intended to minimize such disruptions. For instance, if the disruption is sufficiently brief it may be possible to estimate the relative location and orientation of the FSO devices based on the last kinematic information that was exchanged therebetween prior to the disturbance. That being said, it will be apparent to one of skill in the art that such a system is intended primarily for maintaining an FSO link once it has already been established. Thus, the FSO devices should also support systems and methods for establishing communications between devices that are not already in communication. Such systems and methods are known in the art, such as for example as described by Kahn.

Figure 5A:
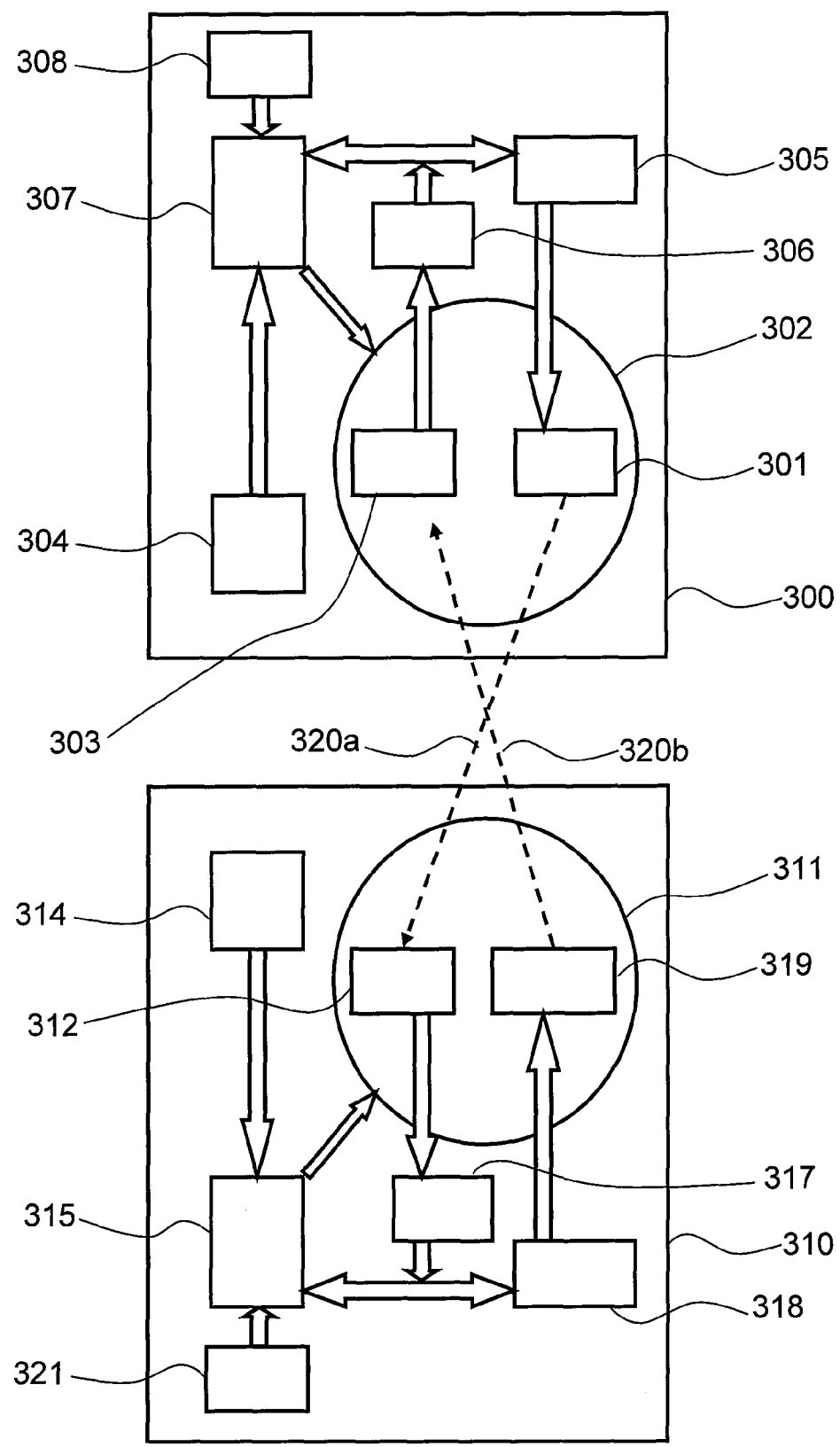
FIG. 5a is a simplified block diagram of two FSO devices forming a point-to-point link, according to an embodiment of the instant invention.
Figure 5B:
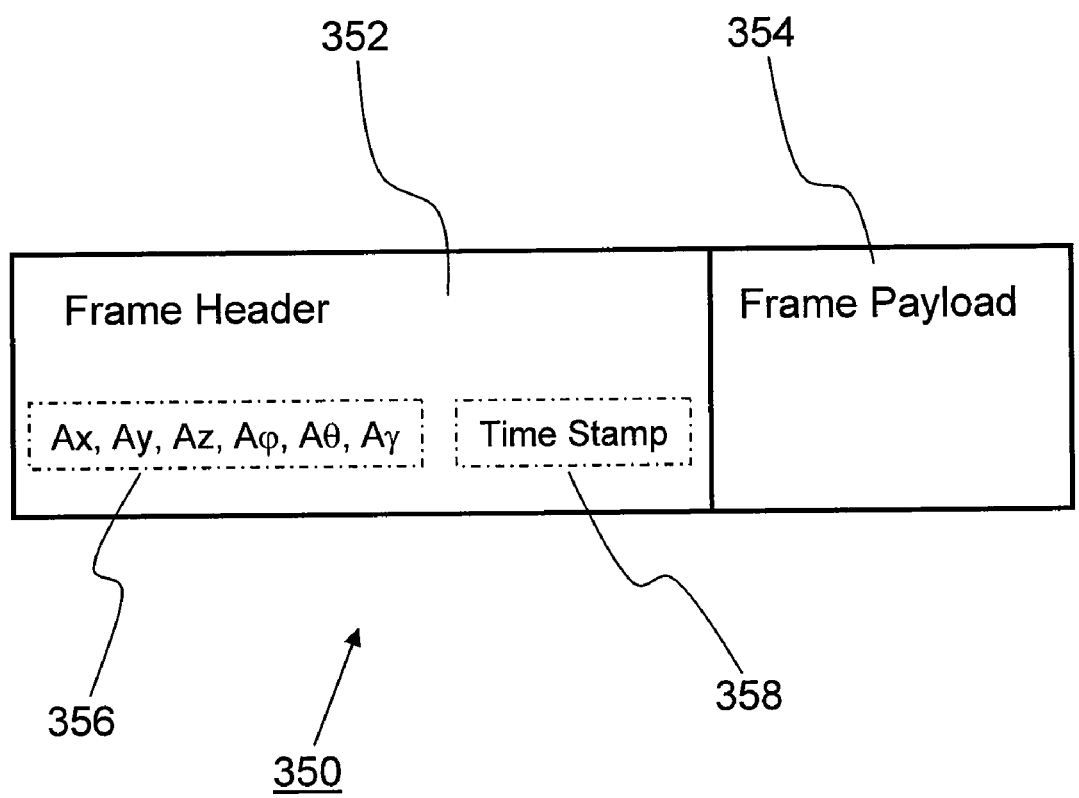
FIG. 5b is a simplified diagram showing the structure of a data frame.

Referring now to FIG. 5a, shown is a simplified block diagram of two FSO devices forming a point-to-point link, according to an embodiment of the instant invention. The block arrows denote data flow within a device, whilst the dotted-line arrows denote free space optical transmission of data between the two FSO devices. In particular, the two FSO devices exchange data frames at regular intervals via free space optical transmission pathways. As is shown in FIG. 5b, each data frame 350 includes a frame header 352 and a frame payload 354. The frame header includes kinematic information 356 relating to the transmitting FSO device, as well as time stamp information 358 that is indicative of a time of measurement of the kinematic information.

Referring still to FIG. 5a and FIG. 5b, a first FSO device 300 includes a transmitter portion including an emitter 301, such as for instance a laser, which is for launching an optical signal along a free space optical communications path 320a. A high-precision positioning device, hereinafter referred to simply as actuator 302, is operatively coupled to the emitter 301 for controllably adjusting the emitter 301 in dependence upon an estimated position and orientation of a second FSO device 310 relative to the first FSO device 300. A kinematic information sensor, such as for instance accelerometer 304, is mounted proximate the emitter 301. The accelerometer 304 provides acceleration information to a processor 307, which in turn provides the acceleration information to an encoder 305. A timer/timestamp generator 308 provides a time value to the processor 307, which in turn provides the time value to the encoder 305. The encoder 305 combines the acceleration information with the time value to provide the output frame header 352. A not illustrated data port supports communication between the encoder 305 and an external device (not shown). When the external device provides external data via the data port, the external data is parsed to provide the frame payload 354 comprising payload data. When payload data is not available a null frame payload is provided. The encoder 305 combines the frame header 352 and the frame payload 354 to provide the frame 350. A signal comprising encoded frame data is provided from the encoder 305 to the emitter 301, which in turn launches an FSO signal comprising the encoded frame data along the free space optical communications path 320a.

The first FSO device 300 also includes a receiver portion including an optical sensor 303, such as for instance a photodiode, for receiving an optical signal comprising encoded frame data propagating along a free space optical communications path 320b. The sensor 303 is operatively coupled to the actuator 302, which adjusts the sensor 303 in dependence upon the estimated position and orientation of the second FSO device 310 relative to the first FSO device 300. A signal comprising the encoded frame data is provided from the sensor 303 to a decoder 306, which extracts the frame header data and the frame payload data. The frame header data is provided to the processor 307, whilst the frame payload data is provided to an external device via a not illustrated data port.

The actuator 302 optionally adjusts the emitter 301 and the sensor 303 either together or independently of one another. In one embodiment, the actuator 302 includes a first actuator for adjusting the emitter 301, and a second actuator for adjusting independently the sensor 303. By way of a specific and non-limiting example, the emitter 301 includes a laser and an optical element such as for instance a reflective optical element (i.e. a mirror). The optical element is in optical communication with the laser for receiving a free space optical communication signal from the laser and for controllably directing the free space optical communication signal along a predetermined free space optical communications pathway. To this end, the first actuator is mechanically coupled to the optical element for controllably adjusting the optical element relative to the laser, such that an optical signal provided from the laser travels to the optical element and is directed thereby along the predetermined free space optical communications pathway. Similarly, the sensor 303 includes a photodiode and an optical element such as for instance a reflective optical element (i.e. a mirror). The optical element is in optical communication with the photodiode for receiving a free space optical communication signal from another FSO communication device and for controllably directing the free space optical communications signal to the photodiode. To this end, the second actuator is mechanically coupled to the optical element for controllably adjusting the optical element relative to the photodiode. Of course, it will be apparent that alternative optical designs that are suitable for alternative embodiment of the instant invention may feature, for instance, transmissive optical elements.

The second FSO device 310 is substantially identical to the first FSO device. The second FSO device 310 includes a transmitter portion including an emitter 319, such as for instance a laser, for launching an optical signal along the free space optical communications path 320b. A high-precision positioning device, hereinafter referred to simply as actuator 311, is operatively coupled to the emitter 319 for controllably adjusting the emitter 319 in dependence upon a predicted position and orientation of the first FSO device 300 relative to the second FSO device 310. A kinematic information sensor, such as for instance accelerometer 314, is mounted proximate the emitter 319. The accelerometer 314 provides acceleration information to a processor 315, which in turn provides the acceleration information to an encoder 318. A timer/timestamp generator 321 provides a time value to the processor 315, which in turn provides the time value to the encoder 318. The encoder 318 combines the acceleration information with the time value to provide an output frame header. A not illustrated data port supports communication between the encoder 318 and an external device (not shown). When the external device provides external data via the data port, the external data is parsed to provide a frame payload comprising payload data. When payload data is not available a null frame payload is provided. The encoder 318 combines the frame header and the frame payload to provide a frame. A signal comprising encoded frame data is provided from the encoder 318 to the emitter 319, which launches a FSO signal comprising the encoded frame data along the free space optical communications path 320b.

The second FSO device 310 also includes a receiver portion including an optical sensor 312, such as for instance a photodiode, for receiving an optical signal comprising encoded frame data propagating along the free space optical communications path 320a. The sensor 312 is operatively coupled to the actuator 311, which adjusts the sensor 312 in dependence upon the predicted position and orientation of the first FSO device 300 relative to the second FSO device 310. A signal comprising the encoded frame data is provided from the sensor 312 to a decoder 317, which extracts the frame header data and the frame payload data. The frame header data is provided to the processor 315, whilst the frame payload data is provided to an external device via a not illustrated data port.

The actuator 311 optionally adjusts the emitter 319 and the sensor 312 either together or independently of one another. In one embodiment, the actuator 311 includes a first actuator for adjusting the emitter 319, and a second actuator for adjusting independently the sensor 312. By way of a specific and non-limiting example, the emitter 319 includes a laser and an optical element such as for instance a reflective optical element (i.e. a mirror). The optical element is in optical communication with the laser for receiving a free space optical communication signal from the laser and for controllably directing the free space optical communication signal along a predetermined free space optical communications pathway. To this end, the first actuator is mechanically coupled to the optical element for controllably adjusting the optical element relative to the laser, such that an optical signal provided from the laser travels to the optical element and is directed thereby along the predetermined free space optical communications pathway. Similarly, the sensor 312 includes a photodiode and an optical element such as for instance a reflective optical element (i.e. a mirror). The optical element is in optical communication with the photodiode for receiving a free space optical communication signal from another communication device and for controllably directing the free space optical communications signal to the photodiode. To this end, the second actuator is mechanically coupled to the optical element for controllably adjusting the optical element relative to the photodiode. Of course, it will be apparent that alternative optical designs that are suitable for alternative embodiment of the instant invention may feature, for instance, transmissive optical elements.

In order to ensure reliable communication between FSO devices it is desirable to obtain the most accurate estimation possible of the future position and orientation of the FSO devices, one relative to the other. The accuracy of such an estimate is typically higher when the estimate is made into the very near future, and when the current position and orientation information are highly accurate. The further out in time the estimate is projected, the less accurate it is likely to be. For this reason, the FSO devices 300 and 310 each measure current kinematic information relating thereto at regular intervals $\Delta t_k$. The FSO devices 300 and 310 subsequently exchange the current kinematic information therebetween. Based on current kinematic information relating to both of the FSO devices 300 and 310, each processor 307 and 315 calculates the coordinates of both FSO devices 300 and 310 at a future time. For instance, processor 307 calculates the expected position of emitter 301 between time $t_k$ and time $t_{k+1}$, at regular intervals of time $\Delta t_s$, where $\Delta t_s$ is the interval of time between sending frames and where $\Delta t_s \ll \Delta t_k$. In other words, processor 307 determines the approximate expected position of emitter 301 at the various times that frame data are transmitted therefrom, for an interval of time between two successive kinematic information measurements. In addition, the same processor 307 also calculates the coordinates of the sensor 312 of the second FSO device 310 between time $t_k + \Delta t_p$ and time $t_{k+1} + \Delta t_p$, at regular intervals of time $\Delta t_s$, where the propagation delay $\Delta t_p$ is the time that is required for an optical signal to travel between the first FSO device and the second FSO device. In other words, processor 307 also determines the expected approximate position of sensor 312 at the various times that frame data are received thereat, for an interval of time between two successive kinematic information measurements. Furthermore, processor 307 calculates the expected position of the sensor 303, and of the emitter 319 of the second FSO device 310.

In an analogous manner, processor 315 determines the expected approximate position of emitter 319 at the various times that frame data are transmitted therefrom, and determines the expected approximate position of sensor 303 at the various times that frame data are received thereat. Furthermore, the processor 315 also determines the expected approximate position of the sensor 312, and of the emitter 301 of the first FSO device 300. Of course, since the optical signal requires a finite amount of time $\Delta t_p$ to propagate between two points in space, the emitter of one FSO device is not aimed precisely at the estimated location of the optical sensor of the other FSO device at the time the optical signal is launched. Rather, the emitter is aimed at a point in space that the optical sensor of the other FSO device is expected to occupy at a time $\Delta t_p$ after the optical signal is launched.

It should also be noted that the timers 308 and 321 of the two FSO devices 300 and 310 are synchronized one with the other. Accordingly, each FSO device estimates the relative position and orientation of the other FSO device at a same future time between $t_k$ and $t_{k+1}$ relative to synchronized timestamp values, which timestamp values are exchanged between the communicating FSO devices along with the current kinematic information. Accordingly, each FSO device performs the estimation independently, based on kinematic information that is measured locally using an accelerometer of that FSO device at a time $t_k$ as determined using a timer that is also local to that FSO device, as well as based on kinematic information that is measured using an accelerometer that is local to the other FSO device at a time $t_k$ as determined using a timer that is also local to the other FSO device.

Figure 6:
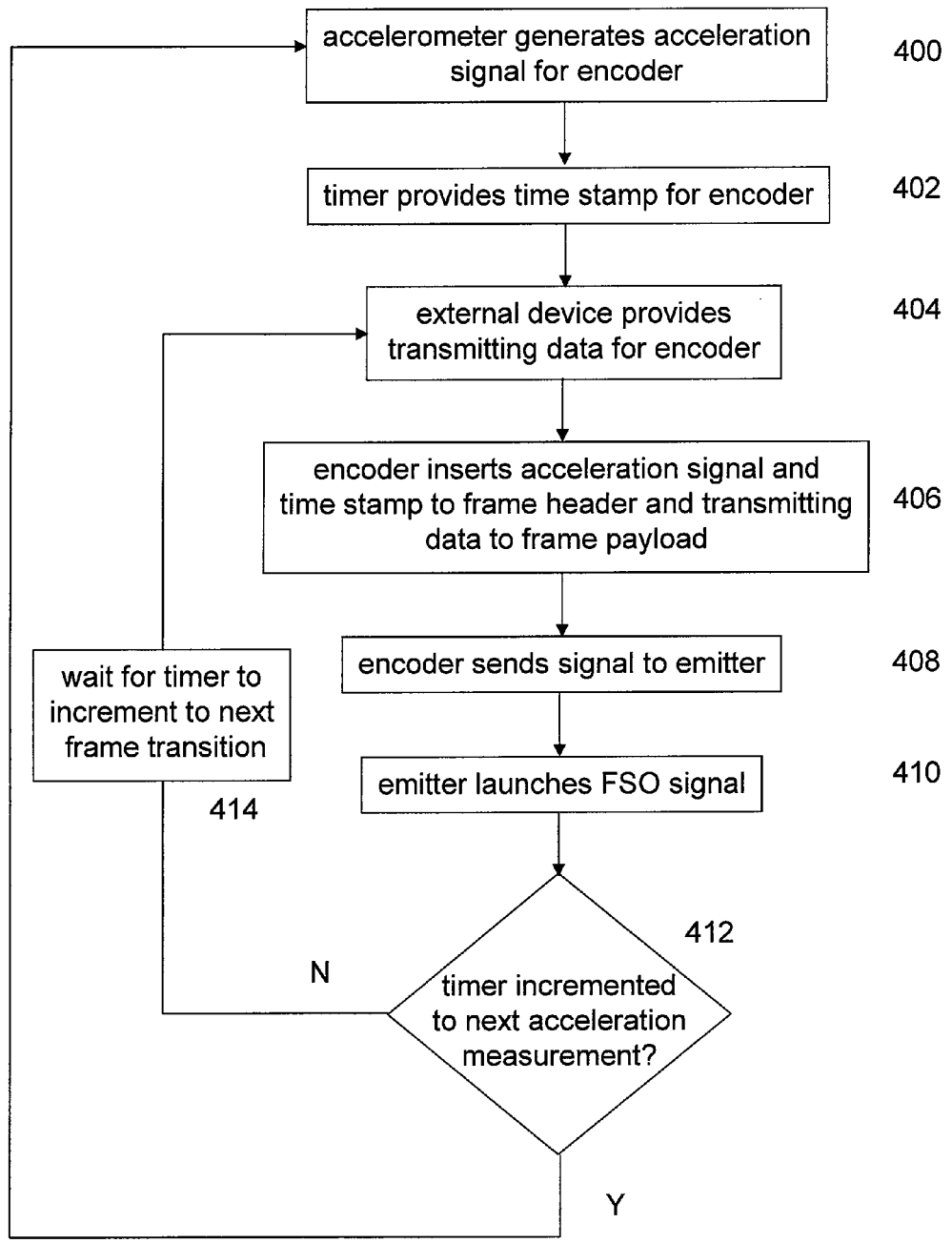
FIG. 6 is a simplified flow diagram showing a method of transmitting data via an emitter of a first FSO device.

FIG. 6 is simplified flow diagram showing a method of transmitting data via an emitter of a first FSO communication device. At step 400, an accelerometer of a first FSO communication device generates an acceleration signal relating thereto, for being provided to an encoder of the first FSO communication device. At step 402 a timer of the first FSO communication device provides a time stamp signal to the encoder of the first FSO communication device. Optionally, the time stamp signal is provided to the encoder of the first FSO communications device either directly from the timer, or indirectly from the timer via the processor of the first FSO communications device. At step 404 an external device provides to the encoder of the first FSO device data for being transmitted thereby. At step 406 the encoder inserts the acceleration signal and the time stamp to the frame header, and inserts the data for being transmitted to the frame payload, so as to generate frame data. At step 408 the encoder sends to the emitter a signal relating to the frame data. At step 410 the emitter launches a FSO signal comprising the frame data. At decision step 412 it is determined whether or not the timer of the first FSO communication device has incremented to the next acceleration measurement time. If it is determined at step 412 that the timer of the first FSO communication device has not incremented to the next acceleration measurement time, then there is a delay at 414 until the timer increments to the next frame transition value, and the steps 404 through 412 are repeated. If it is determined at step 412 that the timer of the first FSO communication device has incremented to the next acceleration measurement time, then all of the steps 400 through 412 are repeated.

Figure 7:
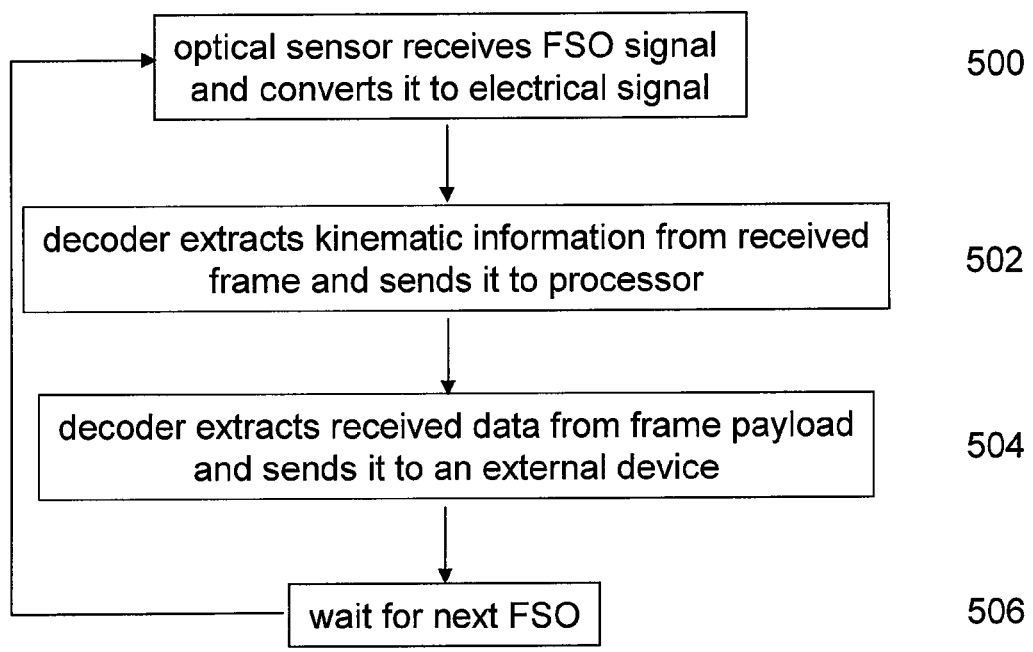
FIG. 7 is a simplified flow diagram showing a method of receiving FSO signals via an optical sensor of a first FSO device.

FIG. 7 is a simplified flow diagram showing a method of receiving FSO signals via an optical sensor of a first FSO communication device. At step 500 an optical sensor of the first FSO communication device receives a FSO signal comprising encoded frame data, and converts the FSO signal to an electrical signal relating to the encoded frame data. At step 502 a decoder of the first FSO communication device extracts kinematic information from a header portion of the frame data. At step 504 the decoder extracts received data from a frame payload portion of the frame data. At step 506 there is a delay until the next FSO signal is received, the method thereafter repeats steps 500 through 504.

Figure 8:
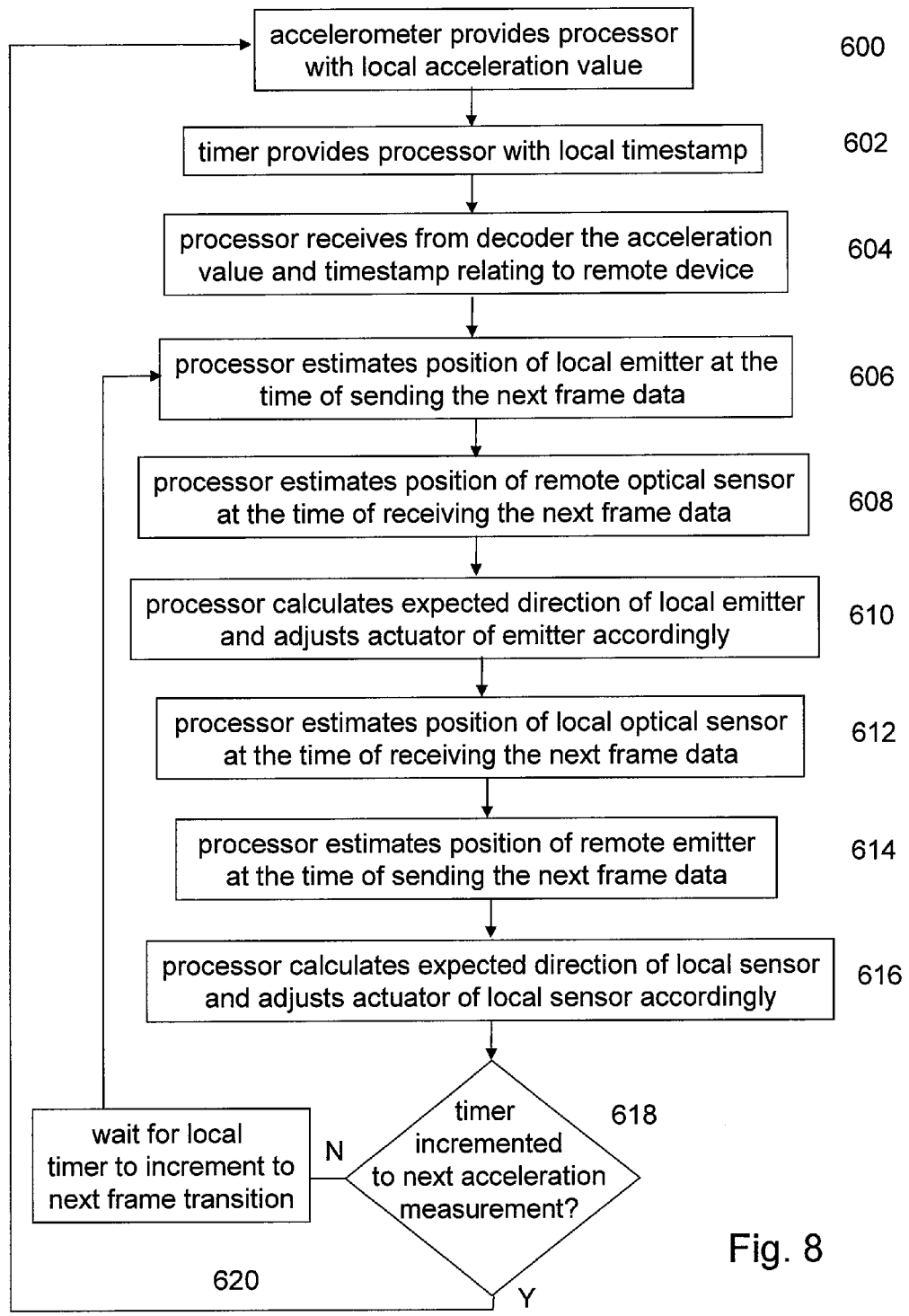
FIG. 8 is a simplified flow diagram showing a method of aligning the optical elements of a FSO device.

FIG. 8 is a simplified flow diagram showing a method of aligning the optical elements of a FSO communication device. At step 600 an accelerometer of a first FSO communication device provides a local acceleration value to a processor of the first FSO communication device. At step 602 a timer of the first FSO communication device provides a local timestamp to the processor of the first FSO communication device. At step 604 the processor of the first FSO communication device receives from a decoder of the first FSO communication device acceleration data and a timestamp value relating to a remote second FSO communication device. At step 606 the processor estimates the position of the emitter of the first FSO communication device at the time of sending the next frame data. At step 608 the processor of the first FSO communication device estimates the position of an optical sensor of the remote second FSO communication device at the time of receiving the next frame data. At step 610 the processor of the first FSO communication device calculates a direction from the estimated position of the emitter of the first FSO communication device and the estimated position of the optical sensor of the remote second FSO communication device. The processor provides a signal to the actuator that is in communication with the emitter of the first FSO communication device, for aligning the emitter along the calculated direction. At step 612 the processor of the first FSO communication device estimates the position of the optical sensor of the first FSO communication device at the time of receiving the next frame data. At step 614 the processor of the first FSO communication device estimates the position of an emitter of the remote second FSO communication device at the time of sending the next frame data. At step 616 the processor of the first FSO communication device calculates a direction from the estimated position of the optical sensor of the first FSO communication device and the estimated position of the emitter of the remote second FSO communication device. The processor provides a signal to the actuator that is in communication with the optical sensor of the first FSO communication device, for aligning the emitter along the calculated direction. At decision step 618 it is determined whether or not the timer of the first FSO communication device has incremented to the next acceleration measurement time. If it is determined at step 618 that the timer of the first FSO communication device has not incremented to the next acceleration measurement time, then there is a delay at step 620 until the timer increments to the next frame transition value, and only the steps 606 through 616 are repeated. If it is determined at step 618 that the timer of the first FSO communication device has incremented to the next acceleration measurement time, then all of the steps 600 through 616 are repeated.

Figure 9:
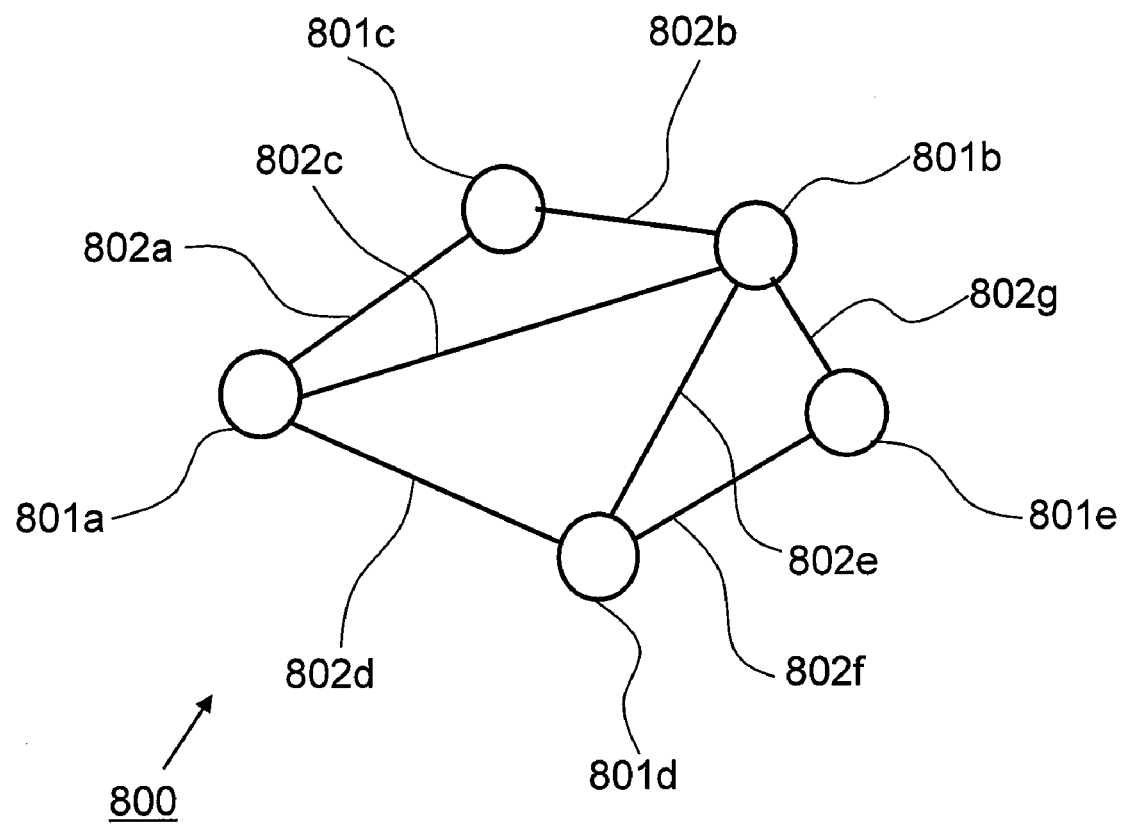
FIG. 9 is a simplified diagram showing a FSO partial mesh network.

It is often desirable to produce an FSO network in the form of a grid or mesh. Such network topologies rely upon nodes that support a relatively large number of optical paths. Such a node supports point to multi-point communication. Referring to FIG. 9 a schematic diagram of an exemplary partial mesh network 800 is shown. The network comprises nodes 801a to 801e and some optical paths 802a to 802g. A person of skill in the art will appreciate that a free space optical network benefits from a grid or mesh configuration because individual optical paths 802a to 802g are subject to being blocked, but grid and mesh type networks often have many redundant paths available thereby ensuring minimal disruption to communication. Consider a case in which node 801a is in communication with node 801b. Optical path segments 802a and 802b, 802d and 802e and 802c all support communication between these two nodes 801a and 801b. Clearly, only one optical path is required to transfer data between the nodes 801a and 801b. For example, in fog or intense precipitation a long FSO path segment 802c may not be available simply because the optical signal being transmitted undergoes too much attenuation. In this case, an FSO path comprising a plurality of shorter optical path segments provides a more robust data link because the shorter path segments are each subject to less attenuation than the long path 802c. Using a mesh network, a given frame payload is optionally transmitted from a first node to a second node via a plurality of optical paths. This serves to reduce the likelihood that the frame payload will not arrive at the desired second node in a timely fashion. Clearly, a complex mesh network optionally supports a large number of redundant optical paths thereby providing a very robust communications link between the nodes.

Figure 10:
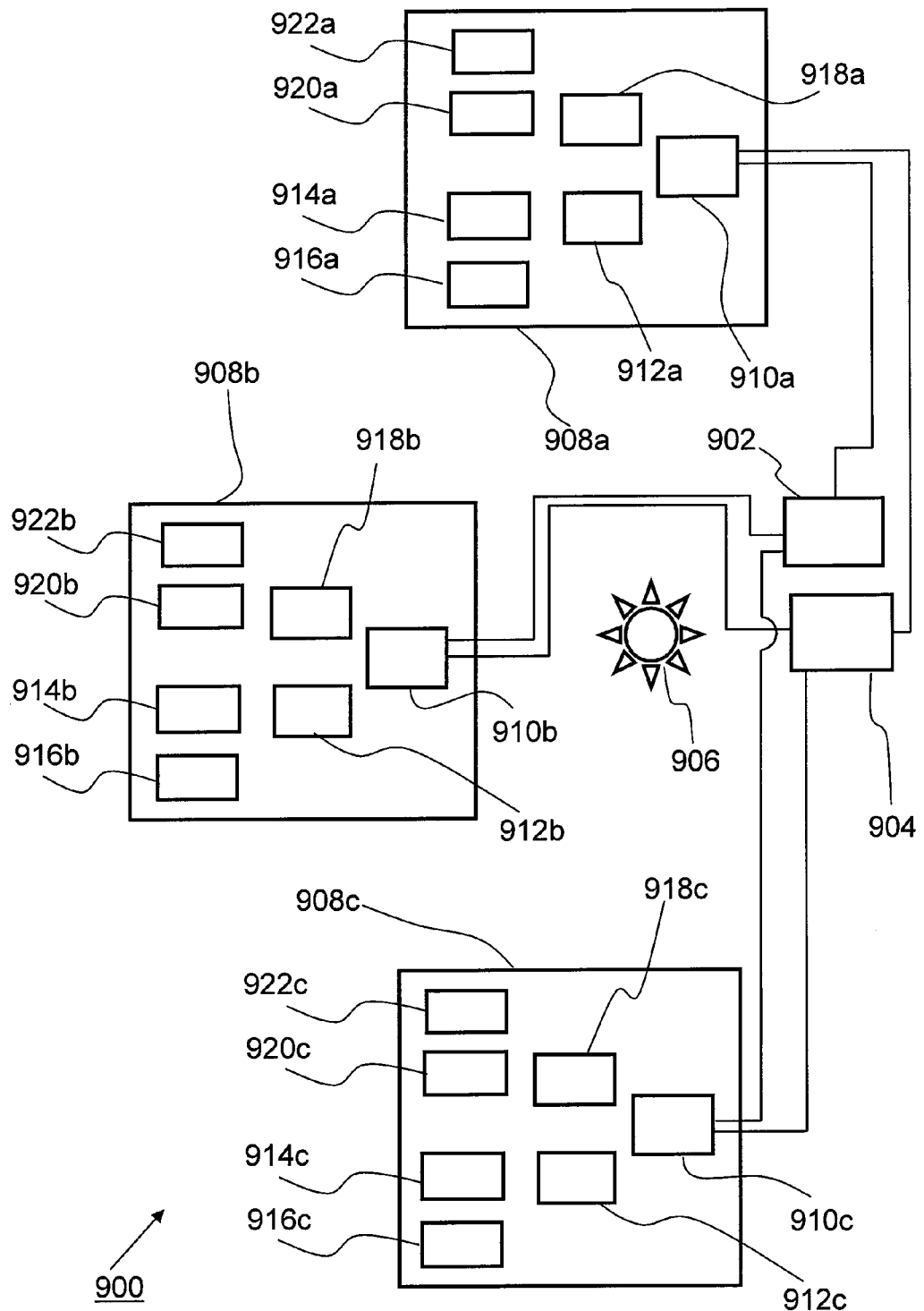
FIG. 10 is a simplified diagram showing a point-to-multipoint FSO device according to an embodiment of the instant invention.

Referring now to FIG. 10, shown is a FSO node 900 according to an embodiment of the instant invention and supporting a plurality of optical paths. Such a FSO device is described as supporting point-to-multipoint communication. In contrast, the FSO devices of FIG. 5a are described as supporting point-to-point communication. The FSO node 900 comprises: a kinematic sensor 902 (i.e. an accelerometer), a timer 904, a switch 906 and a plurality of FSO ports 908a-c. The implementation of the switch 906 depends upon the particular application, and may be for example an IP switch or router, an ATM switch, etc. Each of the FSO ports 908a-c comprises a processor 910a-c that is in communication with the accelerometer 902 and with the timer 904, an encoder 912a-c, a transmitter portion including an emitter 914a-c for launching a FSO communications signal, a first actuator 916a-c for adjusting a corresponding one of the emitters 914a-c in response to control signals that are received from a corresponding one of the processors 910a-c, a decoder 918a-c, a receiver portion including an optical sensor 920a-c for receiving a FSO communications signal, and a second actuator 922a-c for adjusting a corresponding one of the sensors 920a-c in response to control signals that are received from the corresponding one of the processors 910a-c. Optionally, the processors 910a-c are implemented as a single multitasking processor unit.

In use, the accelerometer 902 measures acceleration information relating to the FSO node 900 in a manner that is analogous to that which was described supra with reference to FIG. 5a. The timer 904 determines a time value associated with the acceleration information measurement. The acceleration information and time value are provided to the processors 910a-c of the FSO ports 908a-c that are in communication with other FSO devices. For the purpose of this discussion, FSO port 908a is considered to be representative. Accordingly, processor 910a receives the acceleration information and time value and provides same to the encoder 912a. Encoder 912a generates frame header data in dependence upon the acceleration information and the time value. The encoder 912a receives payload data from a not illustrated data port, and combines the frame header data with the payload data to generate a frame. When no payload data is available then null payload data is provided. The emitter 914a provides a FSO signal having the frame encoded thereon. In this way, a receiving FSO device may receive the frame, decode the frame, and estimate a position and orientation of the FSO node 900. Using the information that is extracted from the decoded frame as well as acceleration information and time value data relating to the receiving FSO device, the receiving device is able to adjust an orientation of an optical sensor and of an emitter so as to enhance optical coupling with the node 900. Similarly, when the node 900 receives optical signals from another node, the received signals comprising an encoded incident frame, the encoded incident frame is decoded. Thus, suitable acceleration and time data relating to the other node is provided to the processor 910a via the decoder 918a. As discussed above, the processor 910a also receives current acceleration information and time data from the accelerometer 902 and timer 904, respectively. Using the acceleration and time data received from the remote node in addition to the local acceleration and time data, the processor 910a determines a correct orientation of the emitter 914a and of the sensor 920a at a future time. The processor 910a provides control signals to the first and second actuators 916a and 922a, respectively, which serves to set the corresponding emitter 914a and sensor 920a to the correct alignment at the future time. Optionally, the node 900 comprises a memory and a memory controller for buffering and storing payload data.

The switch 906 supports payload data exchange between the different FSO ports 908a-c. For instance, when a second FSO node is in communication with FSO node 900 via FSO port 908a and a third FSO node is in communication with FSO node 900 via FSO port 908b, then payload data that is received from the second FSO node is passed via the switch 906 from FSO port 908a to FSO port 908b to be transmitted to the third FSO node. In this way, the second FSO node communicates indirectly with the third FSO node via FSO node 900.

Of course, a person of skill in the art will appreciate that in some cases a FSO node according to the embodiment of the invention as described with reference to FIG. 10 may receive a frame payload and determine that the frame payload is intended for another node. In this case, it is clear that the node 900 would not necessarily receive or send data from or to an external device, via a not illustrated data port, provided the node 900 has a suitable memory system available to store the frame temporarily.

Optionally, the data frame described with reference to FIG. 5b is modified for use in a network according to FIG. 9 featuring nodes analogous to those shown in FIG. 10, such that the data frame comprises acceleration values for various nodes along a multi-node optical path. Thus, when a first communication path is not available due to an obstruction between a sending node and a receiving node it is clear that acceleration information cannot be communicated via the unavailable path. When a second communications path supporting intermediate nodes is available, then the acceleration of the various nodes is communicated along the supported path. Thus, when the obstruction is no longer present it is a simple matter to reestablish direct communication between the sending node and the receiving node because the acceleration and time stamp information of the sending node is available to the receiving node, and therefore an optical element of the receiving node is oriented to enhance the likelihood of receiving a signal from the sending node. Clearly, this advantage is of greater benefit when the FSO system is used to support communication between mobile vehicles, where one cannot expect an emitter from a sending node to have a non-zero average displacement.

When the actuators are sufficiently responsive and the kinematic information is received in a timely fashion, an FSO system described with reference to FIG. 5a or FIG. 10 is suitable for maintaining communications between vehicles that are experiencing differing, substantial and varying accelerations. A system according to at least an embodiment of the instant invention is of particular use in environments where other, more traditional methods of communication are not feasible. For example, most unmanned undersea vehicles require a tether to a remote command station. Alternatively an unmanned undersea vehicle is optionally made autonomous. Using a system according to at least one embodiment of the instant invention, such vehicles are optionally controlled remotely with an FSO communication link, provided a line of sight is available. In order to increase the distance between an unmanned vehicle and the remote command station that controls it, one or more intermediate vehicles are optionally deployed between the unmanned vehicle and the remote command station. Clearly, an intermediate vehicle comprises a point to multipoint FSO device in order to maintain at least two different FSO communication paths. Further optionally, such vehicles support point to multi-point communication and support a grid or mesh style FSO communication network thereby reducing the likelihood that temporary interruption of one FSO path will interrupt communication.

A person of skill in the art will appreciate that an FSO system according to an embodiment of the instant invention is suitable for mounting to structures. More specifically, conventional FSO components are ideally mounted to very stable structures, which helps to ensure that the optical beams are always pointed in the correct direction. In some cases, FSO systems for structures are designed to compensate for small movements. Using a system according to an embodiment of the instant invention, it is clear that a structure that sways in the wind or experiences vibration due to, for example, nearby trains is still suitable as an FSO mounting location. Similarly, an FSO system according to an embodiment of the instant invention is optionally deployed on the hook of a crane, etc. In this way, the operator of the crane can see exactly where the crane payload is positioned. Optionally, an FSO system according to an embodiment of the instant invention is deployed on a surface vehicle such as for instance a sailing ship, a tank, or an armored personnel carrier for supporting FSO communications with other surface vehicles, aircraft, ground stations or satellites. Further optionally, an FSO system according to an embodiment of the instant invention is deployed on an aircraft or satellite, for supporting FSO communications with other aircraft, satellites, surface vehicles or ground stations.

In addition, a system according to an embodiment of the instant invention may be deployed on underwater vehicles, such as for instance manned or unmanned submarine vessels. This is a particularly advantageous application, since radio frequency signals do not propagate through water, and accordingly communications between underwater vehicles is problematic. By way of a specific and non-limiting example, FSO communication signals that are transmitted from a surface craft are able to propagate through the water to an unmanned submarine vessel, for controlling the movements and actions of the said unmanned submarine vessel. Alternatively, the high bandwidth capability of the FSO communications devices makes it practical to consider other novel applications, such as for instance a mechanically decoupled periscope. In this latter case, one or more periscope devices may be deployed by an underwater vehicle, or by another vessel that is either in the air or on the water surface. Once FSO communication is established between the underwater vehicle and the periscope device, images that are captured by the periscope device may be transmitted securely to the underwater vehicle. Furthermore, provided the periscope device includes a propulsion system, the underwater vehicle may control the periscope device remotely, so as to change the direction of viewing, zoom in or out, etc. Advantageously, the underwater vehicle may be positioned at a safe depth and location away from the periscope device, whist still being able to selectably view the activity that is occurring above the surface of the water.

Numerous other embodiments of the invention will be apparent to one of skill in the art without departing from the spirit or scope of the invention. Specifically, there are a variety of other configurations of an FSO system that will easily achieve analogous functionality without using exactly the same hardware configuration. For example, the processor is described as supporting a variety of different data transfer and computing operations. Clearly, the different tasks optionally are carried out by different processors. Similarly, some of these tasks are well suited to be performed by an application specific integrated circuit (ASIC) or programmable logic controller (PLC) that acts as a processor.

What is claimed is:

1. An apparatus for sending and receiving free space optical signals, comprising:
   an accelerometer for measuring first acceleration data relating to the apparatus;
   a timer for providing first time data that is indicative of a time of measurement of the first acceleration data;
   a data input port for receiving external data from a first external source;
   an encoder in communication with the accelerometer, the timer and the data input port, the encoder configured for providing an encoded signal comprising the first acceleration data, the first time data, and first payload data, the first payload data based on the external data;
   an emitter for launching a first optical signal along a free space optical communications pathway, the first optical signal comprising the encoded signal;
   an optical sensor for sensing a second optical signal that is emitted from a second apparatus, the second apparatus also being an apparatus for sending and receiving free space optical signals;
   a decoder for extracting from the second optical signal second acceleration data relating to the second apparatus, second time data indicative of a time of measurement of the second acceleration data, and second payload data, the second payload data provided to the second apparatus from a second external source;

a processor for determining alignment data for supporting free space optical communication between the apparatus and the second apparatus at a future time; and, an actuator for adjusting an alignment status of the emitter and of the optical sensor based on the alignment data, wherein the alignment data is determined based on the first acceleration data, the first time data, the second acceleration data and the second time data.

2. An apparatus according to claim 1, wherein the actuator comprises a first actuator for adjusting the alignment status of the emitter and a second actuator for adjusting separately the alignment status of the optical sensor.

3. An apparatus according to claim 2, wherein the emitter comprises:
- a laser; and,
- a first optical element for receiving the first optical signal from the laser and for controllably directing the first optical signal along the free space optical communications pathway.

4. An apparatus according to claim 3, wherein the first actuator is mechanically coupled to the first optical element for controllably adjusting an angle between the first optical element and the laser in dependence upon the alignment data.

5. An apparatus according to claim 2, wherein the optical sensor comprises:
- a light detector; and,
- a second optical element for receiving the second optical signal and for controllably directing the second optical signal toward the light detector.

6. An apparatus according to claim 5, wherein the second actuator is mechanically coupled to the second optical element for controllably adjusting an angle between the second optical element and the light detector in dependence upon the alignment data.

7. An apparatus according to claim 1, comprising a data output port in communication with the decoder, the data output port for providing the second payload data from the decoder to the first external source.

8. A method for aligning optical components of a free space optical (FSO) communications system, comprising:
- measuring first kinematic data using a sensor mounted within a first FSO communications device of the FSO communications system;
- measuring second kinematic data using a sensor mounted within a second FSO communications device of the FSO communications system;
- providing the first kinematic data to the second FSO communications device via a previously established FSO communications link;
- providing the second kinematic data to the first FSO communications device via the previously established FSO communications link;
- processing the first kinematic data and the second kinematic data locally with respect to the first FSO communications device for determining first alignment data for supporting communication with the second FSO communications device at a future time;
- processing the first kinematic data and the second kinematic data locally with respect to the second FSO communications device for determining second alignment data for supporting communication with the first FSO communications device at the same future time; and,
- based on the first alignment data and the second alignment data, adjusting an alignment status of the FSO communications system.

9. A method according to claim 8, wherein adjusting the alignment status of the FSO communications system comprises aligning optical components of the first FSO communications device based on the first alignment data.

10. A method according to claim 8, wherein adjusting the alignment status of the FSO communications system comprises aligning optical components of the second FSO communications device based on the second alignment data.

11. A method according to claim 9, wherein aligning optical components of the first FSO communications device comprises aligning an emitter and an optical sensor of the first FSO communications device with an optical sensor and an emitter of the second FSO communications device, respectively.

12. A method according to claim 10, wherein aligning optical components of the second FSO communications device comprises aligning an emitter and an optical sensor of the second FSO communications device with an optical sensor and an emitter of the first FSO communications device, respectively.

13. A method according to claim 8, wherein providing the first kinematic data to the second FSO communications device comprises launching a first FSO communications signal from the first FSO communications device to the second FSO communications device via the previously established FSO communications link, the first FSO communications signal having encoded thereon the first kinematic data and first time data that is indicative of a time of measurement of the first kinematic data.

14. A method according to claim 8, wherein providing the second kinematic data to the first FSO communications device comprises launching a second FSO communications signal from the second FSO communications device to the first FSO communications device via the previously established FSO communications link, the second FSO communications signal having encoded thereon the second kinematic data and second time data that is indicative of a time of measurement of the second kinematic data.

15. A method according to claim 8, wherein the sensor mounted within the first FSO communications device comprises a first accelerometer, and wherein measuring first kinematic data relating to the first FSO communications device comprises measuring first acceleration data relating to the first FSO communications device.

16. A method according to claim 8, wherein the sensor mounted within the second FSO communications device comprises a second accelerometer, and wherein measuring second kinematic data relating to the second FSO communications device comprises measuring second acceleration data relating to the second FSO communications device.

17. An apparatus according to claim 1, wherein the emitter is configured to propagate the first optical signal through water and the optical sensor is configured to sense the second optical signal after propagation through water.

18. A method according to claim 13, wherein launching the first FSO communications signal from the first FSO communications device to the second FSO communications device comprises propagating the first FSO communications signal along a path through water between the first FSO communications device and the second FSO communications device.

19. A method according to claim 14, wherein launching the second FSO communications signal from the second FSO communications device to the first FSO communications device comprises propagating the second FSO communications signal along a path through water between the first FSO communications device and the second FSO communications device.

* * * * *